(12) United States Patent
Slaby et al.

(10) Patent No.: US 9,584,639 B2
(45) Date of Patent: Feb. 28, 2017

(54) MOBILE DEVICE MODULAR MAGNETIC ASSEMBLY

(71) Applicant: Motorola Mobility LLC, Chicago, IL (US)

(72) Inventors: Jiri Slaby, Buffalo Grove, IL (US); William R Groves, Naperville, IL (US); Paul M Pierce, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/802,006

(22) Filed: Jul. 17, 2015

(65) Prior Publication Data

US 2017/0019513 A1    Jan. 19, 2017

(51) Int. Cl.
*H04B 1/10* (2006.01)
*H04M 1/02* (2006.01)
*H04B 1/3888* (2015.01)
*H04B 1/3883* (2015.01)

(52) U.S. Cl.
CPC ........ *H04M 1/0283* (2013.01); *H04B 1/3883* (2013.01); *H04B 1/3888* (2013.01); *H04M 1/0262* (2013.01)

(58) Field of Classification Search
CPC .... H04M 1/0283; H04M 1/0202; H04M 1/02; H04M 1/0249; H04M 1/18
USPC ..................... 455/557.1, 575.6, 575.8, 575.1; 379/433.01, 433.1, 433.11, 434; D14/138 R
See application file for complete search history.

*Primary Examiner* — Shaima Q Aminzay

(57) ABSTRACT

In embodiments, a modular magnetic assembly includes a decorative modular section that is stackable with a functional modular section on a housing of a mobile device to form the modular magnetic assembly. The mobile device includes housing metal plates that are integrated in the housing of the device. The functional modular section includes magnets that are each positioned to couple with a respective housing metal plate that is integrated in the device housing. The decorative modular section includes section metal plates that are each positioned to couple with a respective one of the magnets of the functional modular section. The magnets of the functional modular section couple together the decorative modular section and the housing of the mobile device, where one side of the functional modular section stacks against the mobile device, and the other side stacks against the decorative modular section to form the modular magnetic assembly.

20 Claims, 6 Drawing Sheets

MOBILE DEVICE MODULAR MAGNETIC ASSEMBLY

BACKGROUND

Portable devices, such as mobile phones, tablet devices, digital cameras, and other types of computing and electronic devices typically restrict consumers to the combination of features and hardware configurations that are available when a device is purchased. Although many consumers would desire customization choices, only different device models with some feature differences may be available, which are generally limited to the size of device memory and appearance changes. Other than these minimal feature differences, only simplistic functional covers are available after-market so that a consumer may change the exterior appearance and/or color of device. Further, many of the after-market covers are difficult to install and remove, often requiring small tools or applied force that may damage the cover.

BRIEF DESCRIPTION OF THE DRAWINGS

Embodiments of a mobile device modular magnetic assembly are described with reference to the following Figures. The same numbers may be used throughout to reference like features and components that are shown in the Figures.

DETAILED DESCRIPTION

Figure 1:
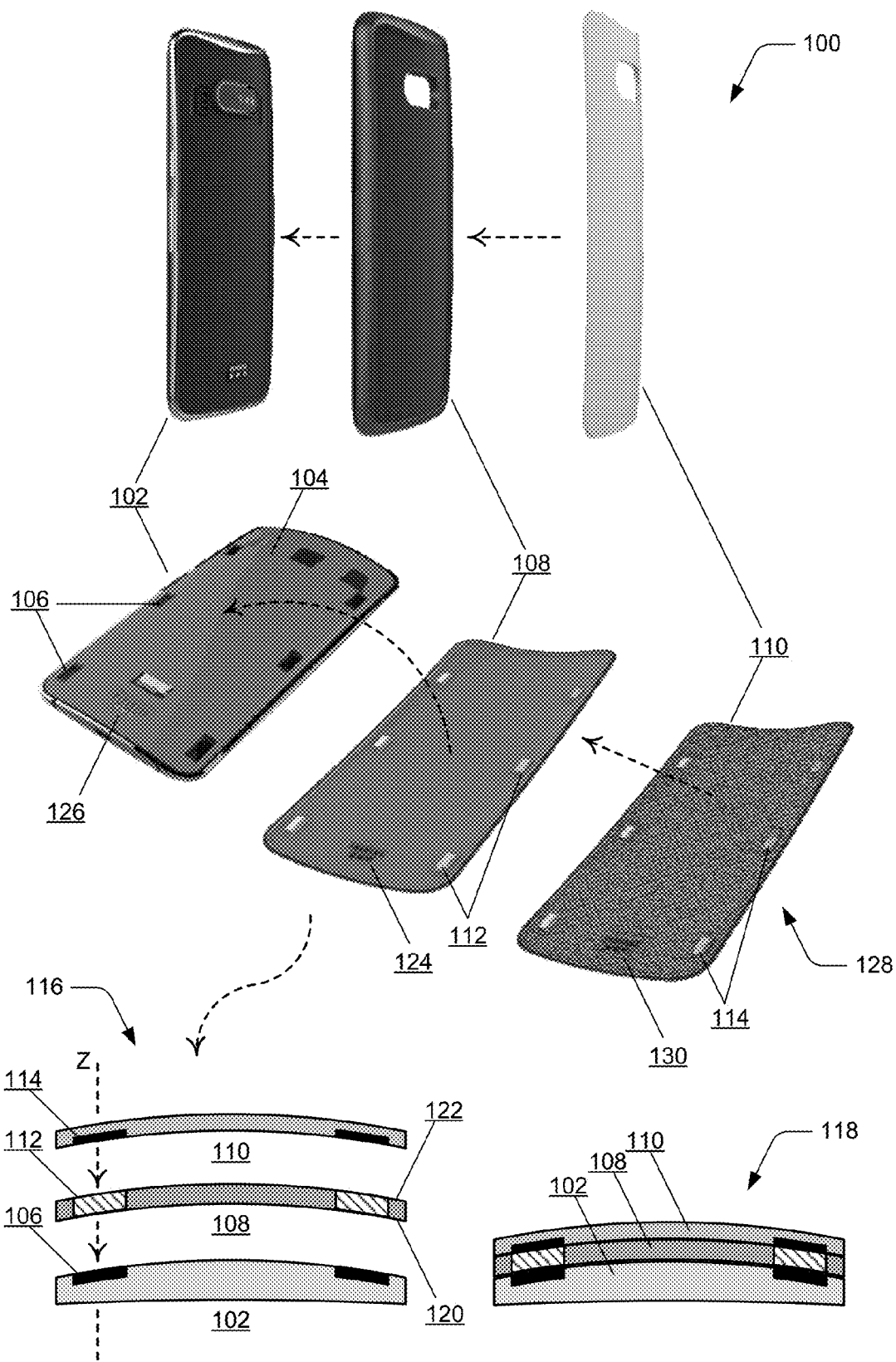
FIG. 1 illustrates an example system in which embodiments of a mobile device modular magnetic assembly can be implemented.

Embodiments of a mobile device modular magnetic assembly are described, such as for any type of mobile device that a user may want to customize by adding different, additional features to expand operation of the device. Typically, portable devices, such as mobile phones and tablet devices, are not readily configurable or customizable and restrict consumers to the particular device models that have a pre-configured combination of features and hardware. A consumer cannot easily add or change desired functionality of a mobile device, such as to add a better camera (e.g., an imager), a different type of sensor, a larger battery, or other user experience functions that may be desired by a particular user of a device. However, by use of integrated magnets and metal plates, embodiments of a mobile device modular magnetic assembly provides that a user can add or remove functional modular sections and/or decorative modular sections for additional features and operations of a device.

In aspects of a mobile device modular magnetic assembly, a decorative modular section is stackable with a functional modular section on a mobile device to form the modular magnetic assembly. The mobile device includes housing metal plates that are integrated in a housing of the device. The functional modular section includes magnets that are each positioned to couple with a respective housing metal plate that is integrated in the device housing. The decorative modular section includes section metal plates that are each positioned to couple with a respective one of the magnets of the functional modular section. The magnets of the functional modular section couple together the decorative modular section and the housing of the mobile device, where one side of the functional modular section stacks against the mobile device, and the other side stacks against the decorative modular section to form the modular magnetic assembly.

The functional modular section of the modular magnetic assembly can be implemented to add any number of different additional features to expand operation of a mobile device. For example, the functional modular section may include a battery as an additional power source to power various components of the mobile device. In other implementations, the functional modular section may provide other functional features that expand operation of the mobile device, such as for wireless charging, as a small projector, any type of a sensor (e.g., environmental conditions, accelerometer, IR sensors, gesture sensors, etc.), as a secondary display device, or as any other type of functional feature. The modular magnetic assembly provides that a user can expand the functional operation of a mobile device without having to open the device and integrate the desired feature. Additionally, the expanded features provided by the functional modular section are not limited to an electrical or computer-based type of function. Rather, the functional modular section may be implemented for impact protection of a mobile device, or as any other type of structural or security enhancement of the device.

The decorative modular section of the modular magnetic assembly can be designed as a decorative cosmetic feature or cover, such as having a matched color materials finish (CMF), providing impact protection, and/or designed as a leather, wood, or metal cover. Further, the decorative modular section is not limited to simply a decorative aspect or characteristic. Rather, the decorative modular section can be implemented for any of the functional features described with reference to the functional modular section. Alternatively, the functional modular section and the decorative modular section can be combined as a single section of the modular magnetic assembly, incorporating any of the additional features to expand operation of a mobile device, as well as providing decorative features and/or impact protection.

While features and concepts of a mobile device modular magnetic assembly can be implemented in any number of different devices, systems, environments, and/or configurations, embodiments of a mobile device modular magnetic assembly are described in the context of the following example devices, systems, and methods.

FIG. 1 illustrates an example of a mobile device modular magnetic assembly 100, which includes a mobile device 102 and the various sections and configurations of the modular magnetic assembly. The example mobile device 102 may be any type of mobile phone, tablet device, digital camera, or other types of computing and electronic devices. The mobile device 102 has a housing 104 that is integrated with housing metal plates 106. The housing metal plates 106 can be integrated or otherwise inlayed in the housing 104 of the device, and the metal plates may be part of the chassis or other feature of the mobile device. In this example, the mobile device 102 has six of the housing metal plates 106 integrated in the housing 104 of the device (e.g., three metal plates integrated on each of the longer sides of the housing). Any number of the housing metal plates in various configurations can be implemented in the housing 104 of the mobile device.

The modular magnetic assembly 100 also includes a functional modular section 108 and a decorative modular section 110. The functional modular section 108 includes magnets 112 that are each positioned to couple with a respective one of the housing metal plates 106 in the housing 104 of the mobile device 102. For example, when the functional modular section 108 is flipped over to stack on the housing 104 of the mobile device, the two identified magnets 112 will align with the two housing metal plates 106 of the device housing. Similar to the device housing, the decorative modular section 110 includes section metal plates 114 that are each positioned to couple with a respective one of the magnets 112 of the functional modular section 108. For example, when the decorative modular section 110 is stacked on the functional modular section 108, the two section metal plates 114 will align with the identified magnets 112 of the functional modular section. In this example, the inlaid metal plates 106 in the housing 104 of the mobile device 102 are also designed with a recess for ease of alignment when a user stacks the functional modular section 108 and the decorative modular section 110 on the mobile device. Other alignment techniques and approaches can be implemented to facilitate alignment of the functional modular section 108 and the decorative modular section 110.

The decorative modular section 110 is stackable with the functional modular section 108 on the mobile device 102 to form the modular magnetic assembly, as shown in the expanded example 116 and in the stacked example 118. In this stack of a modular magnetic assembly, a first side 120 of the functional modular section 108 stacks against the housing 104 of the mobile device 102, and a second side 122 of the functional modular section 108 stacks against the decorative modular section 110 to form the modular magnetic assembly. When stacked in a vertical perspective (e.g., in the z-axis) as shown in the expanded example 116, a magnet 112 couples a dual-plate system of a housing metal plate 106 and a section metal plate 114.

The dual-plate system provides an increased attach force by directing the magnetic field of the magnet 112, such as compared to a magnet-to-magnet coupling. Not only does the dual-plate system with the magnet 112 between the two metal plates focus the magnetic force, the configuration minimizes the magnetic field that is distributed through the mobile device 102. This provides more design freedom to position device components within the housing 104 of the device and avoid magnetic field interference. Further, utilizing a metal plate is cheaper than using another magnet, and the attachment is stronger with the metal to magnet configuration.

The functional modular section 108 of the modular magnetic assembly 100 can be implemented to add any number of different additional features to expand operation of the mobile device 102. For example, the functional modular section 108 may include a battery as an additional power source to power various components of the mobile device. The functional modular section 108 can include a functional contact 124 that connects to an expansion contact 126 of the mobile device 102. The expansion contact is accessible through the housing 104 of the mobile device and is implemented to interface the expanded functionality provided by the functional modular section 108 in embodiments of a mobile device modular magnetic assembly.

In other implementations, the functional modular section 108 may provide other functional features that expand operation of the mobile device 102, such as for wireless charging, as a small projector, any type of a sensor (e.g., environmental conditions, accelerometer, IR sensors, gesture sensors, etc.), as a secondary display device, or as any other type of functional feature. The modular magnetic assembly provides that a user can expand the functional operation of the mobile device 102 without having to open the device and integrate the desired feature. Additionally, any of the expanded features provided by the functional modular section 108 are not limited to an electrical or computer-based type of function. Rather, the functional modular section 108 may be implemented for impact protection of the mobile device 102, or as any other type of structural or security enhancement of the device.

The decorative modular section 110 of the modular magnetic assembly 100 can be designed as a decorative cosmetic feature or cover, such as having a matched color materials finish (CMF), providing impact protection, and/or designed as a leather, wood, or metal cover. As shown at 128, the decorative modular section 110 has an appearance of leather, such as a plastic cover that appears as leather, or a cover that is or utilizes actual leather. Further, the decorative modular section 110 is not limited to simply a decorative aspect or characteristic. Rather, the decorative modular section 110 may include a functional contact 130 and can be implemented for any of the functional features described with reference to the functional modular section 108. In this example, the functional contact 130 of the decorative modular section 110 connects through the functional contact 124 of the functional modular section 108, which then connects to the expansion contact 126 of the mobile device 102 (e.g., implementing a pass-through connection). Alternatively, the functional contacts 124 and 130 may be reduced in size and/or quantity, or eliminated altogether, by use of wireless data and/or wireless power implementations. In other implementations, the functional modular section 108 and the decorative modular section 110 may be combined as a single section of the modular magnetic assembly 100, incorporating any of the additional features to expand operation of the mobile device 102, as well as providing decorative features and/or impact protection.

Figure 2:
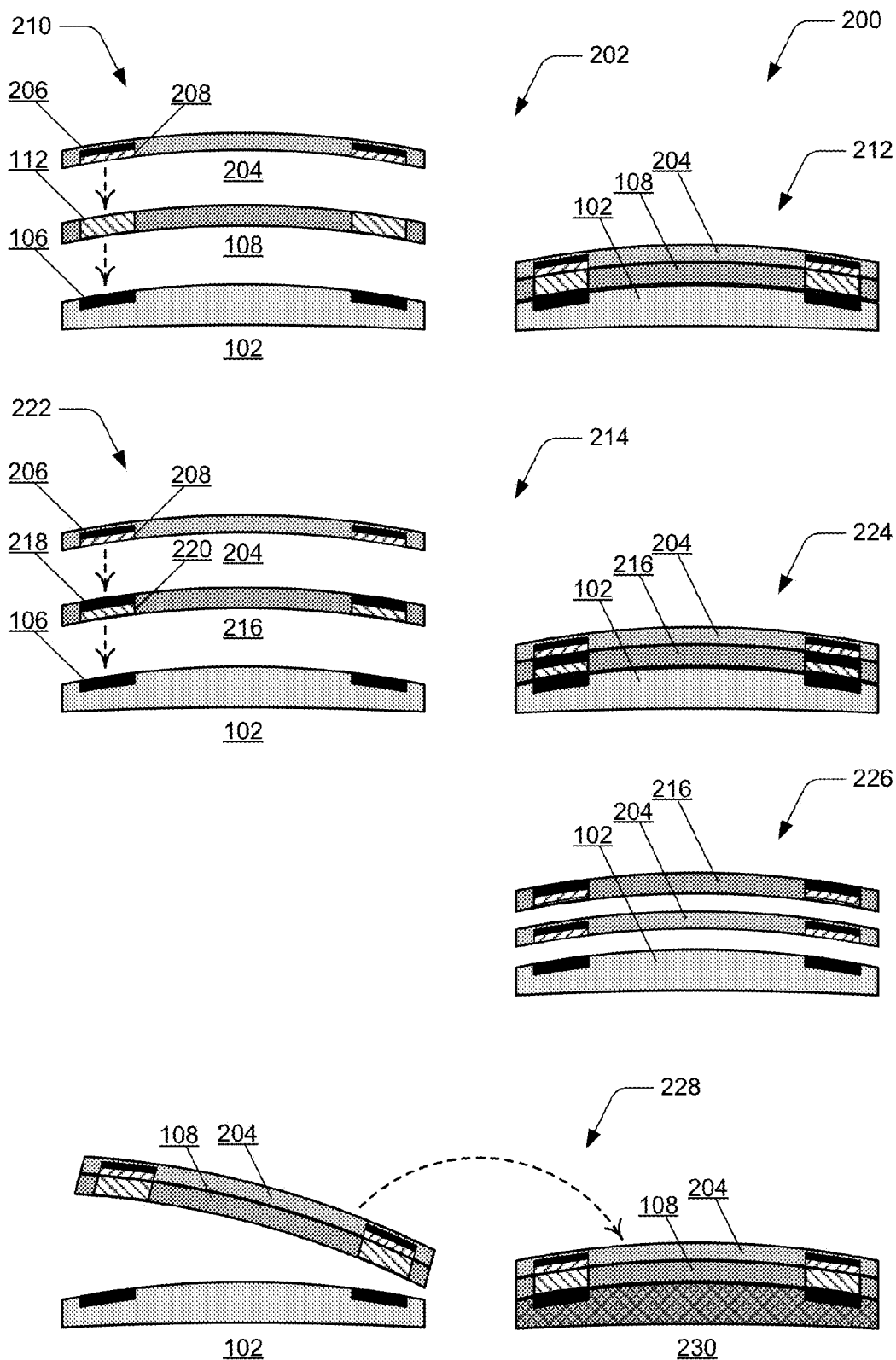
FIG. 2 further illustrates examples of a mobile device modular magnetic assembly in accordance with one or more embodiments.

FIG. 2 further illustrates examples 200 of the mobile device modular magnetic assembly, which includes the mobile device 102 and the various sections and configurations of the modular magnetic assembly. In an example 202, the modular magnetic assembly 100 includes the mobile device 102 and the functional modular section 108 as shown and described with reference to FIG. 1. The modular magnetic assembly also includes a decorative modular section 204 that includes section metal plates 206 and magnets 208, as shown in the expanded example 210 and in the stacked example 212. In this implementation, the magnets 208 of the decorative modular section 204 have a first polarity and the magnets 112 of the functional modular section 108 have a second, different polarity for attraction to the magnets 208 of the decorative modular section. The magnets 208 of the decorative modular section 204 are each positioned to couple with a respective one of the magnets 112 of the functional modular section 108. For example, when the decorative modular section 204 is stacked on the functional modular section 108, the magnets 208 of the decorative modular section will align with the magnets 112 of the functional modular section.

In another example 214, the modular magnetic assembly 100 includes the mobile device 102 as shown and described with reference to FIG. 1, as well as the decorative modular section 204 as described above (e.g., having the section metal plates 206 and the magnets 208). The modular magnetic assembly also includes a functional modular section 216 that includes section metal plates 218 and magnets 220, as shown in the expanded example 222 and in the stacked example 224. In this implementation, the magnets 220 of the functional modular section 216 are each positioned to couple with a respective one of the housing metal plates 106 in the housing 104 of the mobile device 102. The magnets 208 of the decorative modular section 204 are each positioned to then couple with a respective one of the section metal plates 218 of the functional modular section 216. For example, when the decorative modular section 204 is stacked on the functional modular section 216, the magnets 208 of the decorative modular section will align with the section metal plates of the functional modular section.

As further shown at 226, the functional modular section 216 can be stacked on the decorative modular section 204, together on the mobile device 102 to form a different stackable order of the modular magnetic assembly. In this implementation, the magnets 208 of the decorative modular section 204 are each positioned to couple with a respective one of the housing metal plates 106 in the housing 104 of the mobile device 102. The magnets 220 of the functional modular section 216 are each positioned to then couple with a respective one of the section metal plates 206 of the decorative modular section 204. For example, when the functional modular section 216 is stacked on the decorative modular section 204, the magnets 220 of the functional modular section will align with the section metal plates of the decorative modular section.

In aspects of a mobile device modular magnetic assembly, a consumer can purchase a mobile phone, for example, with a decorative modular section, and then at any time in the future, add a functional modular section having any number of the different additional features to expand operation of the mobile phone. Additionally, as shown in an example 228, the user can simply remove the functional modular section 108 and the decorative modular section 204 (e.g., or any other combination of functional modular sections and decorative modular sections described herein) from the mobile device 102 and stack them on a different mobile device 230 having the same or a similar form factor.

Figure 3:
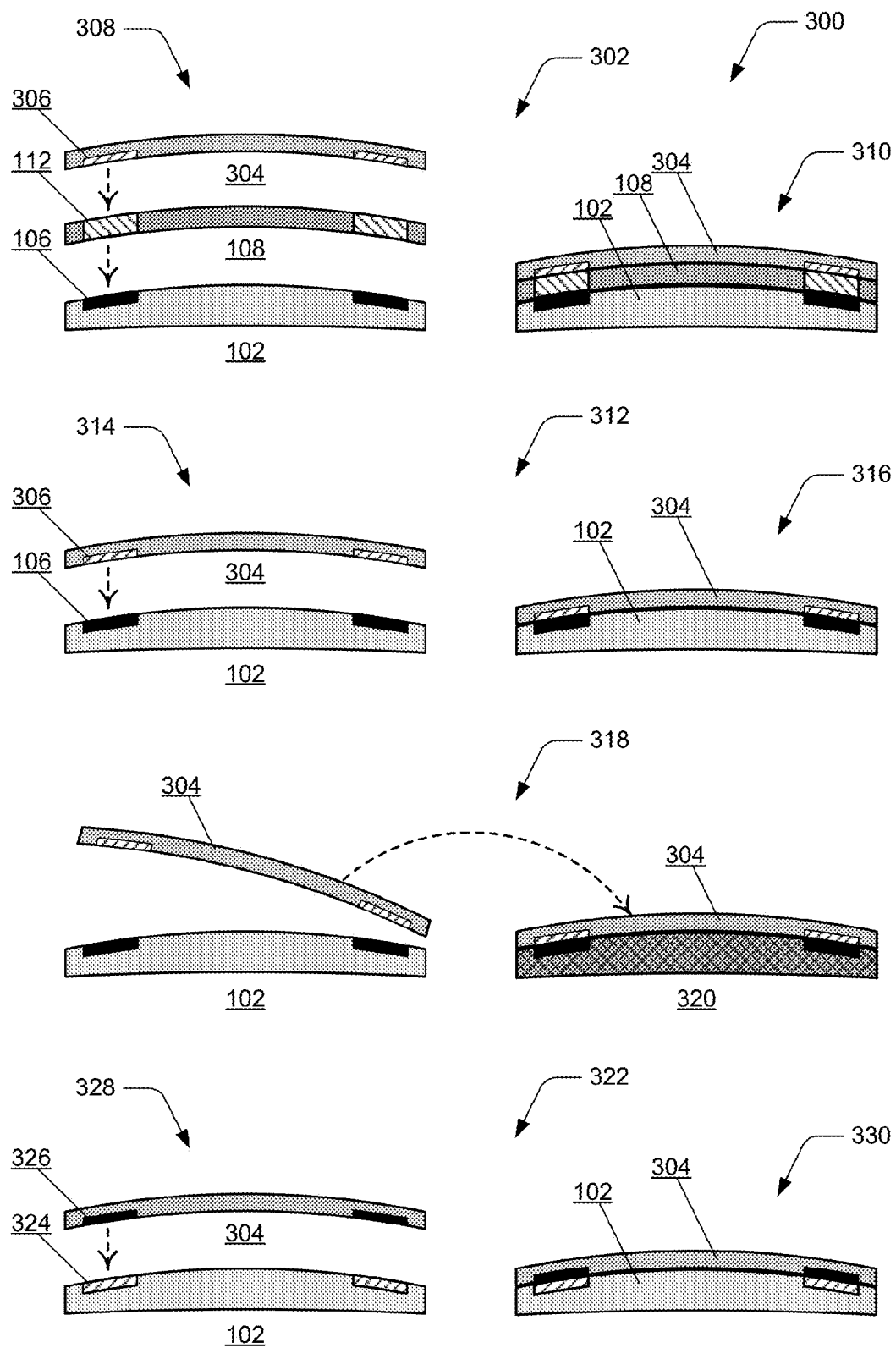
FIG. 3 further illustrates examples of a mobile device modular magnetic assembly in accordance with one or more embodiments.

FIG. 3 further illustrates examples 300 of the mobile device modular magnetic assembly, which includes the mobile device 102 and the various sections and configurations of the modular magnetic assembly. In an example 302, the modular magnetic assembly 100 includes the mobile device 102 and the functional modular section 108 as shown and described with reference to FIG. 1. The modular magnetic assembly also includes a decorative modular section 304 that includes magnets 306, as shown in the expanded example 308 and in the stacked example 310. Note that the decorative modular section 304 is similar to the decorative modular section 110 described with reference to FIG. 1, however the decorative modular section 304 includes the integrated magnets 306 rather than the section metal plates 114. In this implementation, the magnets 306 of the decorative modular section 304 have a first polarity and the magnets 112 of the functional modular section 108 have a second, different polarity for attraction to the magnets 306 of the decorative modular section. The magnets 306 of the decorative modular section 304 are each positioned to couple with a respective one of the magnets 112 of the functional modular section 108. For example, when the decorative modular section 304 is stacked on the functional modular section 108, the magnets 306 of the decorative modular section will align with the magnets 112 of the functional modular section.

In another example 312, the modular magnetic assembly 100 includes the mobile device 102 as shown and described with reference to FIG. 1, and includes the decorative modular section 304 as described above, but without a functional modular section, as shown in the expanded example 314 and in the stacked example 316. In this implementation, the magnets 306 of the decorative modular section 304 are each positioned to couple with a respective one of the housing metal plates 106 in the housing 104 of the mobile device 102 with the functional modular section removed from the modular magnetic assembly. Occasionally, a user of a mobile device may want to remove the functional modular section and/or the decorative modular section so that the device is thinner or more convenient to carry, albeit without the added functionality that is provided by the functional modular section. Additionally, as shown in an example 318, a user can simply remove the decorative modular section 304 (e.g., or any other decorative modular section described herein) from the mobile device 102 and stack it on a different mobile device 320 having the same or a similar form factor.

In another example 322, the modular magnetic assembly 100 includes the mobile device 102 as shown and described with reference to FIG. 1, however with magnets 324 integrated in the housing 104 of the mobile device rather than the housing metal plates. In this example, the modular magnetic assembly 100 also includes the decorative modular section 304 (or may be a functional modular section), and the decorative modular section includes the section metal plates 326 as shown in the expanded example 328 and in the stacked example 330. In this implementation, the magnets 324 of the mobile device 102 are each positioned to couple with a respective one of the section metal plates 326 in the decorative modular section 304 (or may be a functional modular section). Generally, as shown in any of the configurations described herein, the mobile device 102 may be integrated with the magnets, and the decorative modular section and/or the functional modular section may be implemented with the section metal plates, the magnets, or a combination thereof.

In embodiments of the mobile device modular magnetic assembly, any one or combination of the mobile device 102, a functional modular section, and/or a decorative modular section can include the magnets, the metal plates, or a combination thereof. For example, in various implementation combinations, the mobile device includes the metal plates, the functional modular section includes the magnets, and the decorative modular section includes one of the metal plates, the magnets, a combination of magnets stacked on metal plates, or a combination of metal plates stacked on magnets. Alternatively, the mobile device includes the metal plates, the functional modular section includes a combination of metal plates stacked on magnets, and the decorative modular section includes a combination of metal plates stacked on magnets. The metal plates, the magnets, and/or the stacked magnets and metal plates combinations are positioned to align and couple the respective mobile device, functional modular section, and/or decorative modular section. Other implementation combinations are possible, and not limited by these examples of the various implementation combinations.

In other implementation combinations, the mobile device includes the magnets, the functional modular section includes the metal plates, and the decorative modular section includes one of the magnets, the metal plates, or a combination of metal plates stacked on magnets. Alternatively, the mobile device includes the magnets, the functional modular section includes a combination of magnets stacked on metal plates, and the decorative modular section includes a combination of magnets stacked on metal plates. The metal plates, the magnets, and/or the stacked magnets and metal plates combinations are positioned to align and couple the respective mobile device, functional modular section, and/or decorative modular section. Other implementation combinations are possible, and not limited by these examples of the various implementation combinations.

Example methods 400 and 500 are described with reference to respective FIGS. 4 and 5 in accordance with implementations of a mobile device modular magnetic assembly. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
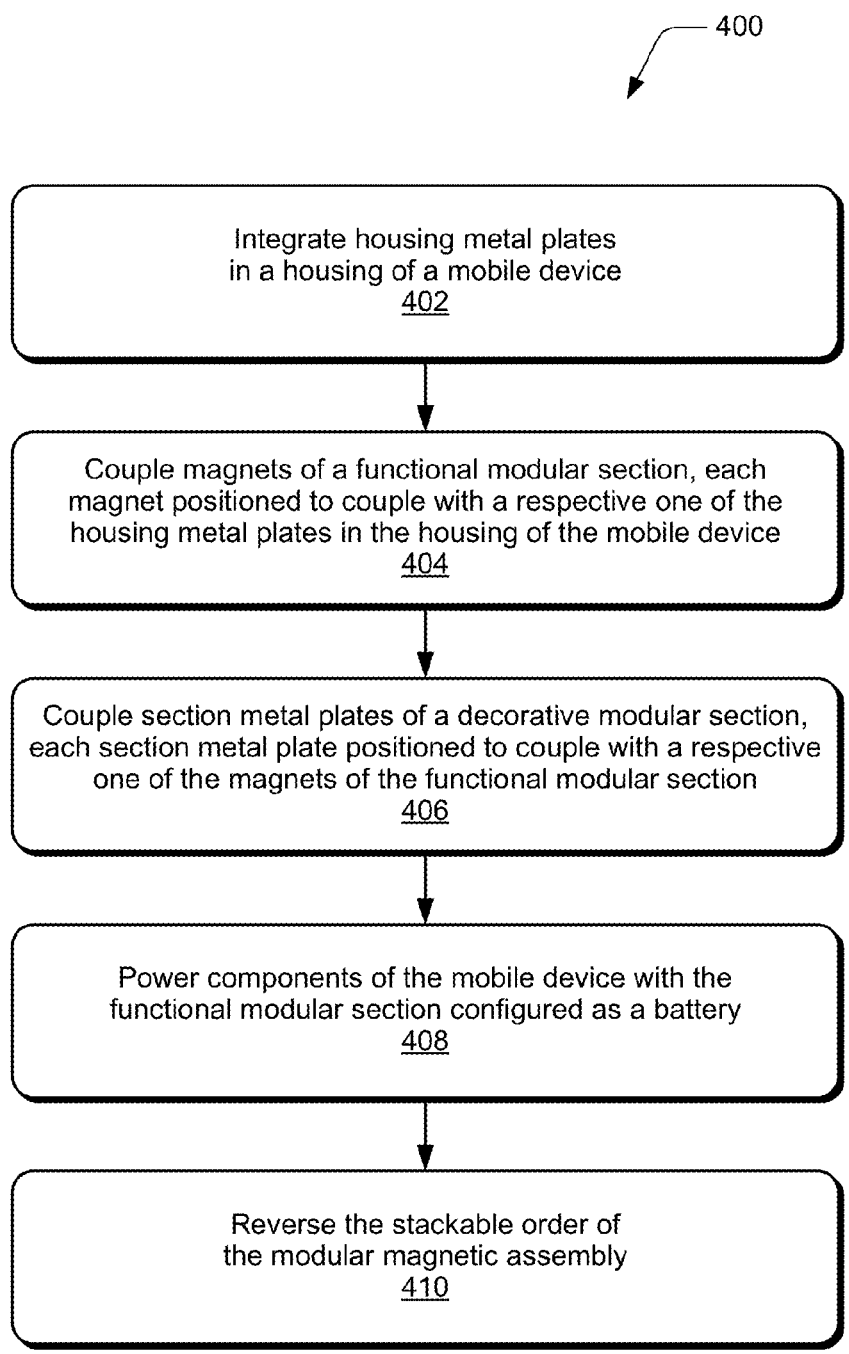
FIG. 4 illustrates an example method of a mobile device modular magnetic assembly in accordance with one or more embodiments.

FIG. 4 illustrates example method(s) 400 of a mobile device modular magnetic assembly. The order in which the method is described is not intended to be construed as a limitation, and any number or combination of the described method operations can be performed in any order to perform a method, or an alternate method.

At 402, housing metal plates are integrated in a housing of a mobile device. For example, the housing 104 of the mobile device 102 includes the housing metal plates 106 that are integrated or otherwise inlayed in the housing 104 of the device, and the metal plates may be part of the chassis or other feature of the mobile device.

At 404, magnets of a functional modular section are each positioned to couple with a respective one of the housing metal plates in the housing of the mobile device. For example, the functional modular section 108 includes the magnets 112 that are each positioned to couple with a respective one of the housing metal plates 106 in the housing 104 of the mobile device 102. When the functional modular section 108 is stacked on the housing 104 of the mobile device, the magnets 112 of the functional modular section will align with the housing metal plates 106 of the device housing. This alignment also facilitates alignment of the data and power contacts (e.g., the functional contact 130 of the decorative modular section 110 connects through the functional contact 124 of the functional modular section 108), unless some or all of these data and power functions are performed wirelessly.

At 406, section metal plates of a decorative modular section are each positioned to couple with a respective one of the magnets of the functional modular section. For example, the decorative modular section 110 includes the section metal plates 114 that are each positioned to couple with a respective one of the magnets 112 of the functional modular section 108. For example, when the decorative modular section 110 is stacked on the functional modular section 108, the two section metal plates 114 will align with the magnets 112 of the functional modular section. The decorative modular section 110 is stackable with the functional modular section 108 on the mobile device 102 to form the modular magnetic assembly, as shown in the expanded example 116 and in the stacked example 118. In this stack of a modular magnetic assembly, a first side 120 of the functional modular section 108 stacks against the housing 104 of the mobile device 102, and a second side 122 of the functional modular section 108 stacks against the decorative modular section 110 to form the modular magnetic assembly. When stacked in a vertical perspective (e.g., in the z-axis) as shown in the expanded example 116, a magnet 112 couples a dual-plate system of a housing metal plate 106 and a section metal plate 114.

At 408, components of the mobile device are powered with the functional modular section configured as a battery. For example, the functional modular section 108 may be configured as a battery designed to power various components of the mobile device 102. The functional modular section 108 includes the functional contact 124 that connects to the expansion contact 126, which is accessible through the housing 104 of the mobile device and is implemented to interface the expanded functionality provided by the functional modular section. Optionally, some or all of the data and power functions can be performed wirelessly by use of wireless data and/or wireless power implementations.

At 410, the stackable order of the modular magnetic assembly is reversed. For example, as illustrated by the magnet and metal plate configurations shown in FIGS. 1-3, the modular magnetic assembly 100 may be the decorative modular section 110 stacked on the functional modular section 108 on the mobile device 102 to form the modular magnetic assembly. Alternatively, the modular magnetic assembly may be the functional modular section 108 stacked on the decorative modular section 110 on the mobile device to form the modular magnetic assembly.

Figure 5:
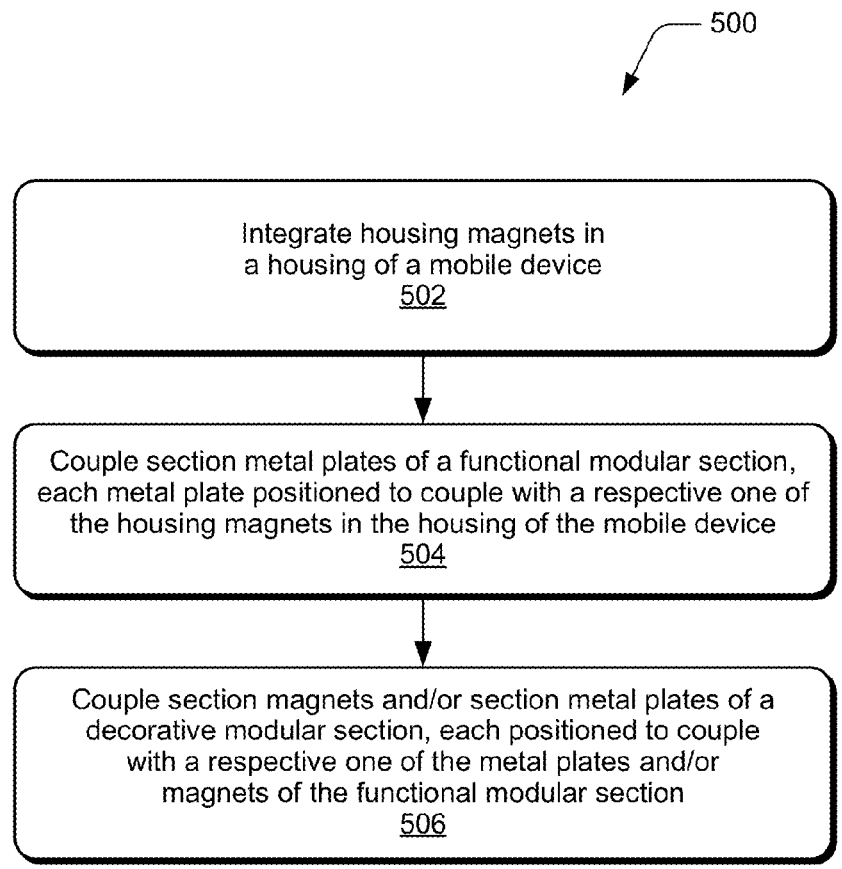
FIG. 5 illustrates another example method of a mobile device modular magnetic assembly in accordance with one or more embodiments.

FIG. 5 illustrates example method(s) 500 of a mobile device modular magnetic assembly. The order in which the method is described is not intended to be construed as a limitation, and any number or combination of the described method operations can be performed in any order to perform a method, or an alternate method.

At 502, housing magnets are integrated in a housing of a mobile device. For example, the housing 104 of the mobile device 102 includes the housing magnets 324 that are integrated or otherwise inlayed in the housing 104 of the device, and the magnets may be part of the chassis or other feature of the mobile device.

At 504, section metal plates of a functional modular section are each positioned to couple with a respective one of the housing magnets in the housing of the mobile device. For example, the functional modular section 108 includes section metal plates that are each positioned to couple with a respective one of the housing magnets in the housing 104 of the mobile device 102. When the functional modular section 108 is stacked on the housing 104 of the mobile device, the section metal plates of the functional modular section will align with the housing magnets 324 of the device housing.

At 506, section magnets and/or section metal plates of a decorative modular section are each positioned to couple with a respective one of the metal plates and/or section magnets of the functional modular section. For example, the decorative modular section 110 includes the section magnets and/or section metal plates that are each positioned to couple with a respective one of the section magnets and/or section metal plates of the functional modular section 108. For example, when the decorative modular section 110 is stacked on the functional modular section 108, the section metal plates will align with the section magnets of the functional modular section, and/or the section magnets of the decorative modular section will align with the section metal plates of the functional modular section. The metal plates, the magnets, and/or the stacked magnets and metal plates combinations are positioned to align and couple the respective mobile device, functional modular section, and/or decorative modular section. Other implementation combinations are possible, and not limited by the examples of the various implementation combinations described herein.

Figure 6:
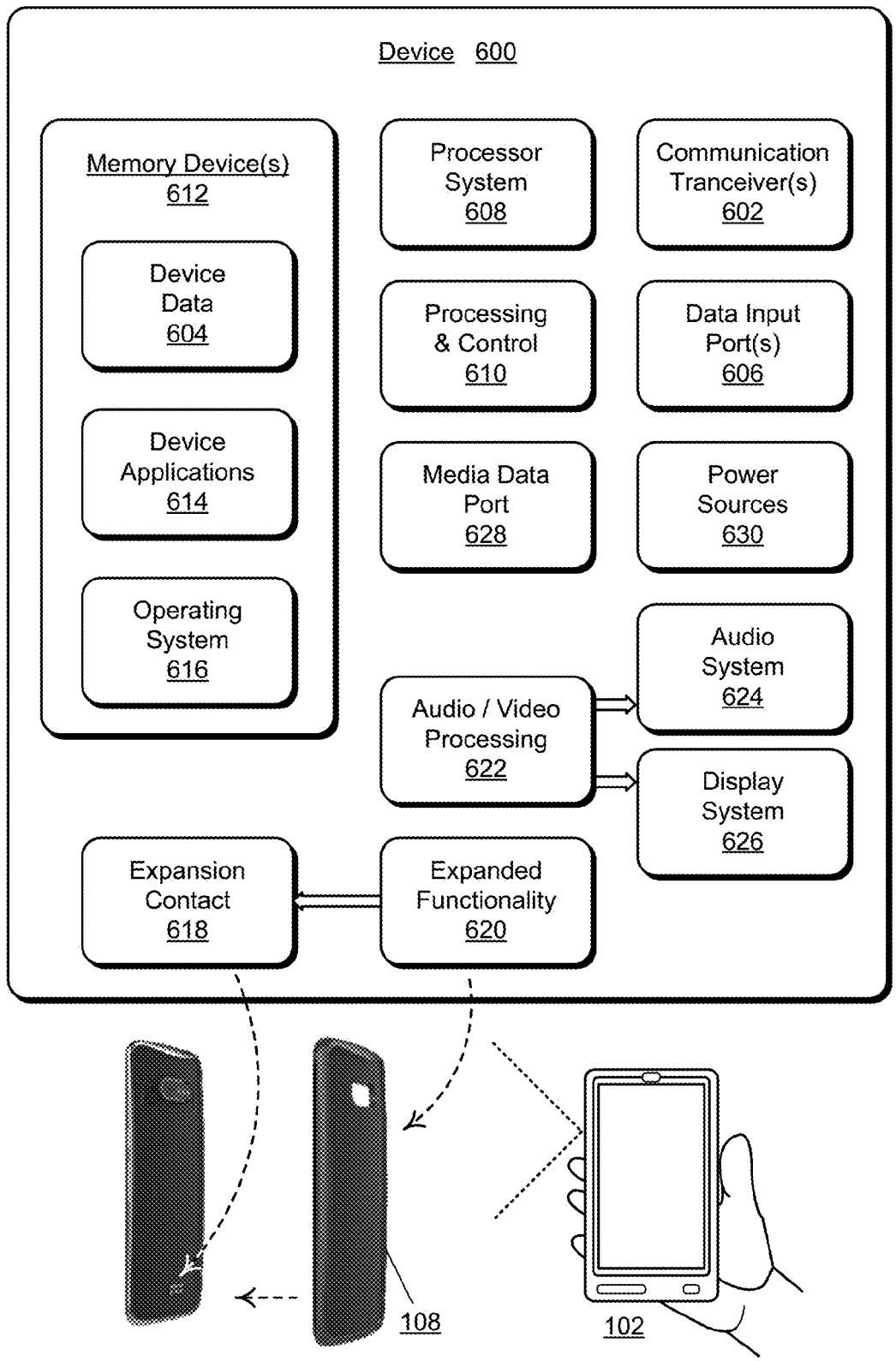
FIG. 6 illustrates various components of an example device that can implement embodiments of a mobile device modular magnetic assembly.

FIG. 6 illustrates various components of an example device 600 in which embodiments of a mobile device modular magnetic assembly can be implemented. The example device 600 can be implemented as the mobile device described with reference to the previous FIGS. 1-5, such as any type of client device, mobile phone, tablet, computing, communication, entertainment, gaming, media playback, and/or other type of device. For example, the mobile device 102 shown in the previous figures may be implemented as the example device 600.

The device 600 includes communication transceivers 602 that enable wired and/or wireless communication of device data 604 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

A computer-readable storage memory 612 provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on.

In this example, the device 600 includes an expansion contact 618 that is implemented to interface the expanded functionality 620 provided by the functional modular section 108 in embodiments of a mobile device modular magnetic assembly. An example of the expansion contact 618 is the expansion contact 126 of the mobile device 102, as shown and described with reference to FIG. 1. The expanded functionality 620 that is provided by the functional modular section 108 may include any number of operational features, such as a battery to power various components of the mobile device, as a wireless charger, a small projector, any type of a sensor, as a secondary display device, or as any other type of functional feature and/or to provide impact protection for the device.

The device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 628. In implementations, the audio system and/or the display system are integrated components of the example device. Alternatively, the audio system and/or the display system are external, peripheral components to the example device.

The device 600 can also include one or more power sources 630, such as when the device is implemented as a mobile device. The power sources may include a charging and/or power system, and can be implemented as a flexible strip battery, a rechargeable battery, a charged super-capacitor, and/or any other type of active or passive power source.

Although embodiments of a mobile device modular magnetic assembly have been described in language specific to features and/or methods, the subject of the appended claims is not necessarily limited to the specific features or methods described. Rather, the specific features and methods are disclosed as example implementations of a mobile device modular magnetic assembly, and other equivalent features and methods are intended to be within the scope of the appended claims. Further, various different embodiments are described and it is to be appreciated that each described embodiment can be implemented independently or in connection with one or more other described embodiments.

The invention claimed is:

1. A system, comprising:
a mobile computing device that includes housing metal plates integrated in a housing of the mobile computing device;
a functional modular section that includes one or more magnets, each positioned to couple with a respective one of the housing metal plates in the housing of the mobile computing device; and
a decorative modular section that includes one or more section metal plates, each positioned to couple with a respective one of the one or more magnets of the functional modular section, the decorative modular section stackable with the functional modular section on the mobile computing device to form a modular magnetic assembly.

2. A system as recited in claim 1, wherein a first side of the functional modular section is configured to stack against the housing of the mobile computing device, and a second side of the functional modular section is configured to stack against the decorative modular section to form the modular magnetic assembly.

3. A system as recited in claim 1, wherein the functional modular section includes a battery configured to power components of the mobile computing device.

4. A system as recited in claim 1, wherein the functional modular section implements a functional feature that expands operation of the mobile computing device.

5. A system as recited in claim 1, wherein the functional modular section is configured for impact protection of the mobile computing device.

6. A system as recited in claim 1, wherein:
the decorative modular section further includes one or more first polarity magnets, each positioned to couple with a respective one of the one or more magnets of the functional modular section; and
the one or more magnets of the functional modular section being of a second polarity for attraction to the one or more first polarity magnets of the decorative modular section.

7. A system as recited in claim 6, wherein:
the functional modular section is removable from the modular magnetic assembly; and
the one or more first polarity magnets of the decorative modular section are each positioned to couple with a respective one of the housing metal plates in the housing of the mobile computing device, the decorative modular section being stackable on the mobile computing device.

8. A system as recited in claim 6, wherein:
the functional modular section further includes one or more section metal plates, each positioned to couple with a respective one of the one or more first polarity magnets of the decorative modular section in the modular magnetic assembly; and
the functional modular section being stackable with the decorative modular section on the mobile computing device to form a different stackable order of the modular magnetic assembly.

9. A system as recited in claim 1, wherein:
the decorative modular section and the functional modular section are removable from the housing of the mobile computing device; and
the decorative modular section being stackable with the functional modular section on another mobile computing device to form a different modular magnetic assembly.

10. A method, comprising:
integrating housing metal plates in a housing of a mobile computing device;
coupling magnets of a functional modular section, each magnet positioned to couple with a respective one of the housing metal plates in the housing of the mobile computing device; and
coupling section metal plates of a decorative modular section, each section metal plate positioned to couple with a respective one of the magnets of the functional modular section, the decorative modular section stackable with the functional modular section on the mobile computing device to form a modular magnetic assembly.

11. A method as recited in claim 10, wherein a first side of the functional modular section stacks against the housing of the mobile computing device, and a second side of the functional modular section stacks against the decorative modular section to form the modular magnetic assembly.

12. A method as recited in claim 10, further comprising:
powering components of the mobile computing device with the functional modular section configured as a battery.

13. A method as recited in claim 10, further comprising:
reversing the stackable order of the modular magnetic assembly; wherein
the decorative modular section further includes first polarity magnets, each positioned to couple with a respective one of the magnets of the functional modular section; and
the functional modular section further includes section metal plates, each positioned to couple with a respective one of the first polarity magnets of the decorative modular section in the modular magnetic assembly.

14. A method as recited in claim 10, wherein:
the decorative modular section and the functional modular section are removable from the mobile computing device housing; and
the decorative modular section being stackable with the functional modular section on a housing of another mobile computing device to form a different modular magnetic assembly.

15. A modular magnetic assembly, comprising:
a functional modular section that includes metal plates, each positioned to couple with a respective housing magnet that is integrated in a housing of a mobile computing device; and
a decorative modular section that includes section magnets, each positioned to couple with a respective one of the metal plates of the functional modular section, the decorative modular section stackable with the functional modular section on the housing of the mobile computing device to form the modular magnetic assembly.

16. A modular magnetic assembly as recited in claim 15, wherein a first side of the functional modular section is configured to stack against the housing of the mobile computing device, and a second side of the functional modular section is configured to stack against the decorative modular section to form the modular magnetic assembly.

17. A modular magnetic assembly as recited in claim 15, wherein:
the decorative modular section further includes first polarity magnets, each positioned to couple with a respective one of the housing magnets that are integrated in the housing of the mobile computing device; and
the housing magnets of the mobile computing device being of a second polarity for attraction to the first polarity magnets of the decorative modular section.

18. A modular magnetic assembly as recited in claim 17, wherein:
the functional modular section is removable from the modular magnetic assembly; and
the first polarity magnets of the decorative modular section are each positioned to couple with a respective one of the housing magnets in the housing of the mobile computing device, the decorative modular section being stackable on the mobile computing device.

19. A modular magnetic assembly as recited in claim 17, wherein:
the functional modular section further includes section magnets, each positioned to couple with a respective one of the first polarity magnets of the decorative modular section; and
the functional modular section being stackable with the decorative modular section on the housing of the mobile computing device to form a different stackable order of the modular magnetic assembly.

20. A modular magnetic assembly as recited in claim 15, wherein:
the decorative modular section and the functional modular section are removable from the housing of the mobile computing device; and
the decorative modular section being stackable with the functional modular section on a housing of another mobile computing device to form a different modular magnetic assembly.

\* \* \* \* \*